US008780872B1

(12) United States Patent
Ramamurthy et al.

(10) Patent No.: US 8,780,872 B1
(45) Date of Patent: Jul. 15, 2014

(54) DUAL-TECHNOLOGY WIRELESS COEXISTENCE FOR MULTI-ANTENNA DEVICES

(75) Inventors: Harish Ramamurthy, Sunnyvale, CA (US); Todd Steven Wheeler, San Jose, CA (US); Brian Bosso, Santa Clara, CA (US); Atul Salhotra, Santa Clara, CA (US); Ken Yeung, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 127 days.

(21) Appl. No.: 13/228,071

(22) Filed: Sep. 8, 2011

Related U.S. Application Data

(60) Provisional application No. 61/381,010, filed on Sep. 8, 2010.

(51) Int. Cl.
*H04W 4/00* (2009.01)
(52) U.S. Cl.
USPC .......................................... 370/338; 370/328
(58) Field of Classification Search
USPC ........................................................ 370/338
See application file for complete search history.

(56) References Cited

U.S. PATENT DOCUMENTS

| | | | | |
|---|---|---|---|---|
| 6,560,443 | B1 * | 5/2003 | Vaisanen et al. ................. | 455/73 |
| 2004/0116075 | A1 * | 6/2004 | Shoemake et al. ........... | 455/41.2 |
| 2006/0274704 | A1 * | 12/2006 | Desai et al. .................... | 370/338 |
| 2008/0238807 | A1 * | 10/2008 | Ibrahim et al. ................ | 343/876 |
| 2011/0212696 | A1 * | 9/2011 | Hahn et al. ...................... | 455/83 |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

IEEE 802.11n; Multi-Rate Layered Decoder Architecture for Block LDPC Codes of the IEEE 802.11n Wireless Standard; Feb. 5, 2007; pp. 1645-1648.

IEEE 802.11z; Extensions to Direct Link Setup (DLS) comments; Jul. 16, 2009; 3 pages.

IEEE P802.11g/D8.2, Apr. 2003 (Supplement to ANSI/IEEE Std 802.11-1999(Reaff 2003)); DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

(Continued)

*Primary Examiner* — Yemane Mesfin
*Assistant Examiner* — Jeff Banthrongsack

(57) ABSTRACT

Apparatus having corresponding methods and computer-readable media comprise: a first antenna; a second antenna; a first wireless local-area network (WLAN) transceiver configured to operate, on a dedicated basis, with the first antenna; a second WLAN transceiver configured to share operation of the second antenna; and a non-WLAN transceiver configured to operate with the second antenna with the second WLAN transceiver.

19 Claims, 6 Drawing Sheets

(56) References Cited

OTHER PUBLICATIONS

IEEE P802.11k-2008 (Amendment to IEEE Std 802.11-2007), May 9, 2008; IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 1: Radio Resource Measurement of Wireless LANs; LAN/MAN Standards Committee of the IEEE Computer Society; 244 pages.

IEEE P802.11s/D2.0, Mar. 2008; Draft STANDARD for Information Technology—Telecommunications and information exchange between systems—Local and metropolitan area networks—Specific requirements—Part 11: Wireless LAN Medium Access Control (MAC) and Physical Layer (PHY) specifications Amendment: Mesh Networking; IEEE 802 Committee of the IEEE Computer Society; 263 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999/Cor 1-2001 (Corrigendum to IEEE Std 802.11b-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications: Amendment 2: Higher-Speed Physical Layer Extension in the 2.4 GHz Band—Corrigendum 1; LAN/MAN Standards Committee of the IEEE Computer Society; Nov. 7, 2001, 23 pages.

IEEE Std 802.11d-2001(Amendment to IEEE Std 802.11, 1999 Edition, IEEE Std 802.11a-1999, and IEEE Std 802.11b-1999); Jun. 2001; IEEE Standard for Information technology—Telecommunications and information exchange between systems—Local and metropolitan area networks—Specific requirements; Part 11: Wireless LAN Medium Access Control (MAC) and Physical Layer (PHY) specifications, Amendment 3: Specification for operation in additional regulatory domains; LAN/MAN Standards Committee of the IEEE Computer Society; 34 pages.

IEEE Std 802.11e/D11.0, Oct. 2004 (Amendment to ANSI/IEEE Std 80211-1999 (2003 Reaff) edition as amended by IEEE Std 802.11g-2003, IEEE Stad 802.11h-2003 and IEEE 802.11i-2004); IEEE Standard for Information technology—Telecommunications and information exchange between systems—Local and metropolitan area networks—Specific requirements—Part 11: Wireless LAN Medium Access Control (MAC) and Physical Layer (PHY) specifications: Amendment 7: Medium Access Control (MAC) Quality of Service (QoS) Enhancements; LAN/MAN Standards Committee of the IEEE Computer Society; 195 pages.

IEEE Std 802.11h-2003 (Amendment to IEEE Std 802.11 TM, 1999 Edition (Reaff 2003); Oct. 14, 2003; IEEE Standard for Information technologyTelecommunications and information exchange between systems—Local and metropolitan area networksSpecific requirements, Part 11: Wireless LAN Medium Access Control (MAC) and Physical Layer (PHY) specifications, Amendment 5: Spectrum and Transmit Power Management Extensions in the 5 GHz band in Europe; LAN/MAN Standards Committee of the IEEE Computer Society; 75 pages.

IEEE Std 802.11i (Amendment to IEEE Std 802.11, 1999 Edition (Reaff 2003) as amended by IEEE Stds 802.11a-1999, 802.11b-1999, 802.11b-1999/Cor 1-2001, 802.11d-2001, 802.11g-2003, and 802.11h-2003); IEEE Standard for Information technology—Telecommunications and information exchange between systems—Local and metropolitan area networks—Specific requirements—Part 11: Wireless LAN Medium Access Control (MAC) and Physical Layer (PHY) specifications: Amendment 6: Medium Access Control (MAC) Security Enhancements; LAN/MAN Standards Committee of the IEEE Computer Society; Jul. 23, 2004; 190 pages.

\* cited by examiner

DUAL-TECHNOLOGY WIRELESS COEXISTENCE FOR MULTI-ANTENNA DEVICES

CROSS-REFERENCE TO RELATED APPLICATIONS

This disclosure claims the benefit of U.S. Provisional Patent Application Ser. No. 61/381,010, filed Sep. 8, 2010, which is incorporated herein by reference.

FIELD

The present disclosure relates generally to wireless communications. More particularly, the present disclosure relates to coexistence between wireless local-area networking (WLAN) signals and non-WLAN signals.

BACKGROUND

The popularity of various wireless networking technologies for handheld platforms has created a need to integrate multiple networking technologies on a single integrated circuit. Of these networking technologies, the two most widely used are wireless local-area networking (WLAN) and Bluetooth. Both of these technologies use the same un-licensed 2.4 GHz Industrial, Scientific and Medical (ISM) band. This situation poses a difficult problem for designing integrated circuits and external logic components that allow both of these technologies to simultaneously coexist.

One solution is temporal coexistence (also referred to as time-multiplex coexistence). A conventional temporal coexistence implementation 100 is shown in FIG. 1. Referring to FIG. 1, a WLAN transceiver 102 and a Bluetooth transceiver 104 share an antenna 106 using a switch 108 that is controlled by a switch controller 110. Because Bluetooth operates according to a known schedule, switch controller 110 can schedule WLAN transmissions around the Bluetooth transmissions. However, because the Bluetooth schedule is not known to WLAN link partners such as access points and the like, there are frequent collisions on the receive side. These collisions can reduce WLAN performance to one-half of baseline. In addition, it is necessary to include additional protection in switch controller 110 to prevent rate spirals. This additional protection involves additional complexity and cost.

SUMMARY

In general, in one aspect, an embodiment features an apparatus comprising: a first antenna; a second antenna; a first wireless local-area network (WLAN) transceiver configured to operate, on a dedicated basis, with the first antenna; a second WLAN transceiver configured to share operation of the second antenna; and a non-WLAN transceiver configured to operate with the second antenna with the second WLAN transceiver.

In general, in one aspect, an embodiment features a method of transmitting and receiving communications in a device, wherein the device includes a first antenna, a second antenna, a first wireless local-area network (WLAN) transceiver, a second WLAN transceiver, and a non-WLAN transceiver, and wherein the method comprises: operating the first WLAN transceiver with the first antenna on a dedicated basis, operating the second WLAN transceiver and the non-WLAN transceiver with the second antenna on a shared basis.

In general, in one aspect, an embodiment features computer-readable media embodying instructions executable by a computer to perform functions comprising: operating a first wireless local-area network (WLAN) transceiver with a first antenna on a dedicated basis; operating a second WLAN transceiver with a second antenna; and operating a non-WLAN transceiver with the second antenna.

The details of one or more implementations are set forth in the accompanying drawings and the description below. Other features will be apparent from the description and drawings, and from the claims.

Figure 1:
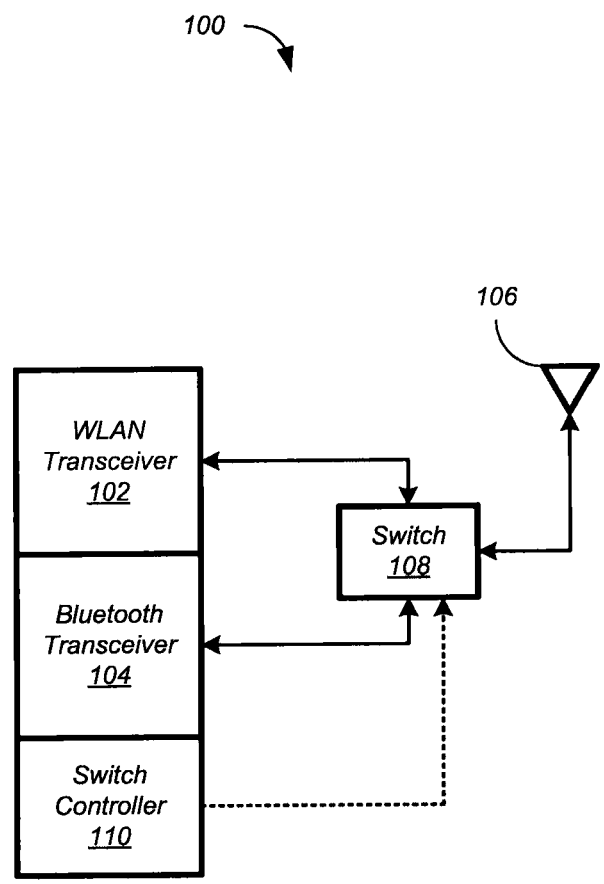
FIG. 1 shows a conventional temporal coexistence implementation for WLAN and Bluetooth.

The leading digit(s) of each reference numeral used in this specification indicates the number of the drawing in which the reference numeral first appears.

DETAILED DESCRIPTION

Embodiments of the present disclosure provide dual-technology wireless coexistence for multi-antenna devices. In particular, in one aspect, the disclosed embodiments describe coexistence for wireless local-area networking (WLAN) and Bluetooth technologies. However, while the disclosed embodiments are described in terms of WLAN and Bluetooth technologies, the disclosed techniques are applicable to other wireless technologies as well. The wireless technologies can include non-WLAN signals other than Bluetooth. For example, the non-WLAN signals can include near field communication (NFC) signals, FM signals, GPS signals, other ISM band signals, and the like.

In the described embodiments, dual-technology wireless coexistence is provided by spatial coexistence. That is, the WLAN signals and Bluetooth signals use different antennas. In some embodiments, all of the antennas can be used for the WLAN signals when Bluetooth signals are absent, not used, or the like. In such embodiments, the WLAN transceiver can be operated in multiple-input and multiple-output (MIMO) mode. In some embodiments, temporal coexistence can be used instead of spatial coexistence under some circumstances, for example when Bluetooth traffic levels are low, when the received Bluetooth or WLAN signal is weak, when the antennas and/or adaptive frequency hopping (AFH) cannot provide sufficient isolation, and the like. In some embodiments, the device can negotiate the number of MIMO streams with an access point, for example using the IEEE 802.11n spatial multiplexing (SM) powersave mechanism or similar mechanisms.

Figure 2:
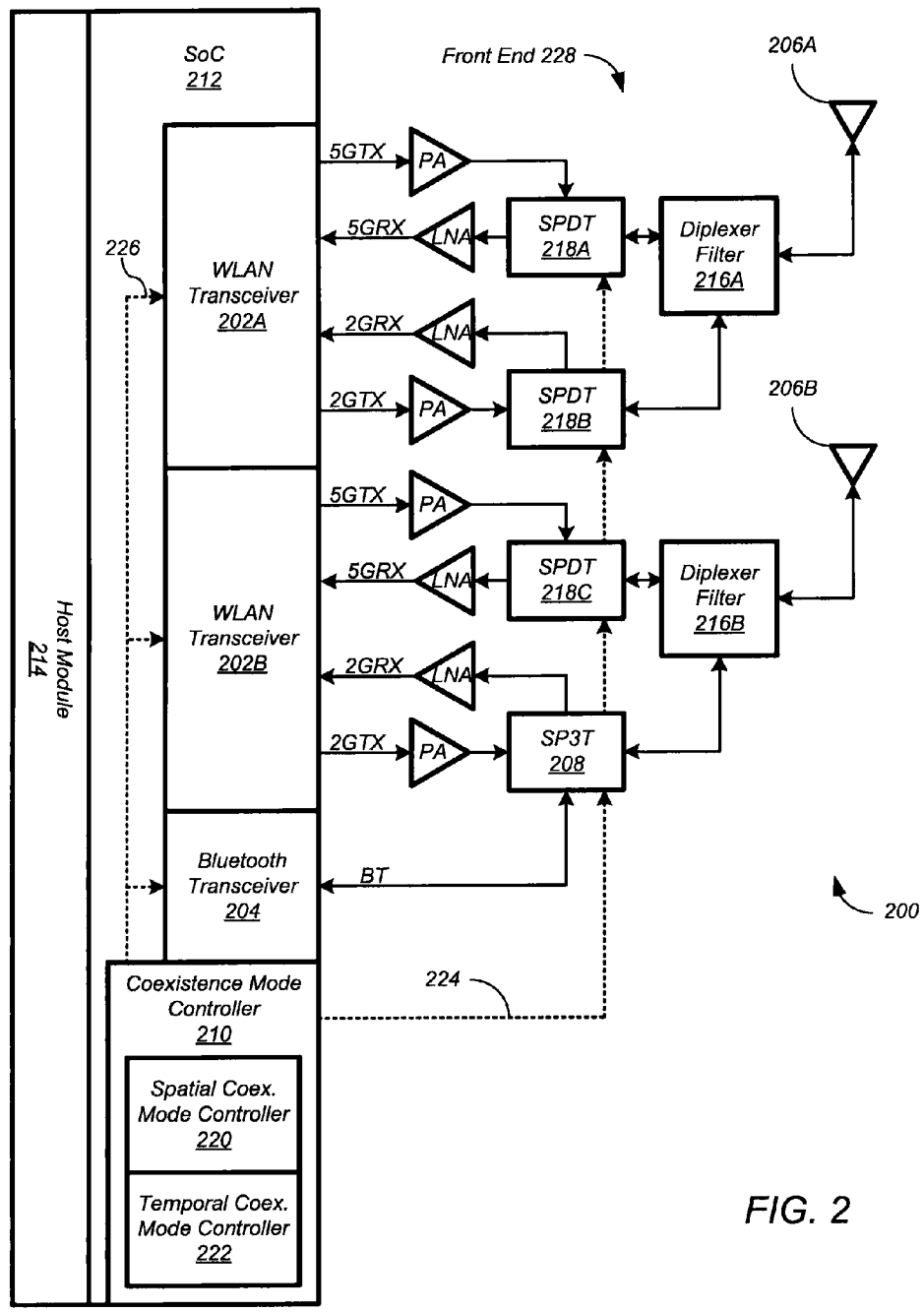
FIG. 2 shows elements of a dual-technology wireless communication device having multiple antennas according to one embodiment.

FIG. 2 shows elements of a dual-technology wireless communication device 200 having multiple antennas according to one embodiment. Although in the described embodiments, the elements of device 200 are presented in one arrangement, other embodiments may feature other arrangements, as will be apparent to one skilled in the relevant arts based on the disclosure and teachings provided herein. For example, elements of device 200 can be implemented in hardware, software, or combinations thereof. In some embodiments, device 200 is compliant with all or part of IEEE standard 802.11, including draft and approved amendments 802.11a, 802.11b, 802.11d, 802.11e, 802.11g, 802.11h, 802.11i, 802.11k, 802.11n, 802.11p, 802.11r, 802.11s, 802.11u, 802.11v, 802.11w, 802.11z, and 802.11aa, and with the Bluetooth standard issued by the Bluetooth Special Interest Group.

Referring to FIG. 2, dual-technology wireless communication device 200 includes a dual-technology wireless communication system-on-chip (SoC) 212 electrically coupled to a host module 214 and a front end 228. Front end 228 is electrically coupled to radio-frequency (RF) antennas 206A and 206B. Dual-technology wireless communication device 200 can be implemented as any sort of device, for example including smartphones, personal digital assistants (PDAs), computers, and the like. Antennas 206 can be implemented in any manner. Host module 214 can be implemented in any manner, and can interface with SoC 212 using any sort of interface, for example including Secure Digital Input/Output (SDIO), Universal Serial Bus (USB), universal asynchronous receiver/transmitter (UART), and the like.

Dual-technology wireless communication SoC 212 includes a Bluetooth transceiver 204 and two WLAN transceivers 202A and 202B. However, the elements of SoC 212 can be implemented separately if desired. For example, Bluetooth transceiver 204 can be implemented on one SoC while WLAN transceivers 202A and 202B are implemented on another SoC. In addition, Bluetooth transceiver 204 generally has differential outputs that are terminated with a balun. However, for clarity the balun is not shown in FIG. 2.

Antenna 206A is dedicated to WLAN transceiver 202A (that is, WLAN transceiver 202A is configured to operate with antenna 206A on a dedicated basis), while antenna 206B is shared by WLAN transceiver 202B and Bluetooth transceiver 204 (that is, WLAN transceiver 202B and Bluetooth transceiver 204 are configured to operate with antenna 206B on a shared basis). In other embodiments wireless communication device 200 can include more WLAN transceivers 202 and antennas 206. In particular, communication device 200 can include N WLAN transceivers 202 and N antennas 206, where N is an integer greater than one, and where the N antennas 206 include one shared antenna 206 and N−1 dedicated antennas 206. The techniques disclosed herein apply to such embodiments as well.

Front end 228 provides signal paths between transceivers 202, 204 and antennas 206. In particular, front end 228 provides signal paths between WLAN transceiver 202A and dedicated antenna 206A. Front end 228 also provides signal paths between shared antenna 206B, WLAN transceiver 202B and Bluetooth transceiver 204. WLAN transceivers 202 are capable of operation in both the 2.4 GHz band and the 5 GHz band. Front end 228 includes diplexers 216A and 216B that provide signal paths for both bands between antenna 206s and WLAN transceivers 202. Diplexers 216 can include filters such as band-pass filters and the like as well. Front end 228 also includes power amplifiers (PA) and low-noise amplifiers (LNA) for the WLAN signal paths. In particular, each WLAN receive path includes a low-noise amplifier, and each WLAN transmit path includes a power amplifier.

Front end 228 also includes switches 218, 208 to switch between transmit and receive signals, and to provide a signal path for Bluetooth signals. In particular, single-pole double-throw (SPDT) switch 218A switches between 5 GHz WLAN transmit (5GTX) and receive (5GRX) signals, and SPDT switch 218B switches between 2.4 GHz WLAN transmit (2GTX) and receive (2GRX) signals, for WLAN transceiver 202A. Similarly, SPDT switch 218C switches between 5GTX and 5GRX signals for WLAN transceiver 202A. Single-pole triple-throw (SP3T) switch 208 allows sharing of antenna 206B between WLAN transceiver 202B and Bluetooth transceiver 204. In particular, SP3T switch 208 switches between 2GTX signals, 2GRX signals, and Bluetooth (BT) transmit and receive signals. All of the switches 218, 208 operate according to switch control signals 224.

SoC 212 also includes a coexistence mode controller 210. Coexistence mode controller 210 includes a spatial coexistence mode controller 220 and a temporal coexistence mode controller 222. Coexistence mode controller 210 provides switch control signals 224 and mode control signals 226. Transceivers 202, 204 operate according to mode control signals 226 as described below. In FIG. 2, control signal paths are shown as broken arrows, while communication signal paths are shown as solid arrows.

Figure 3:
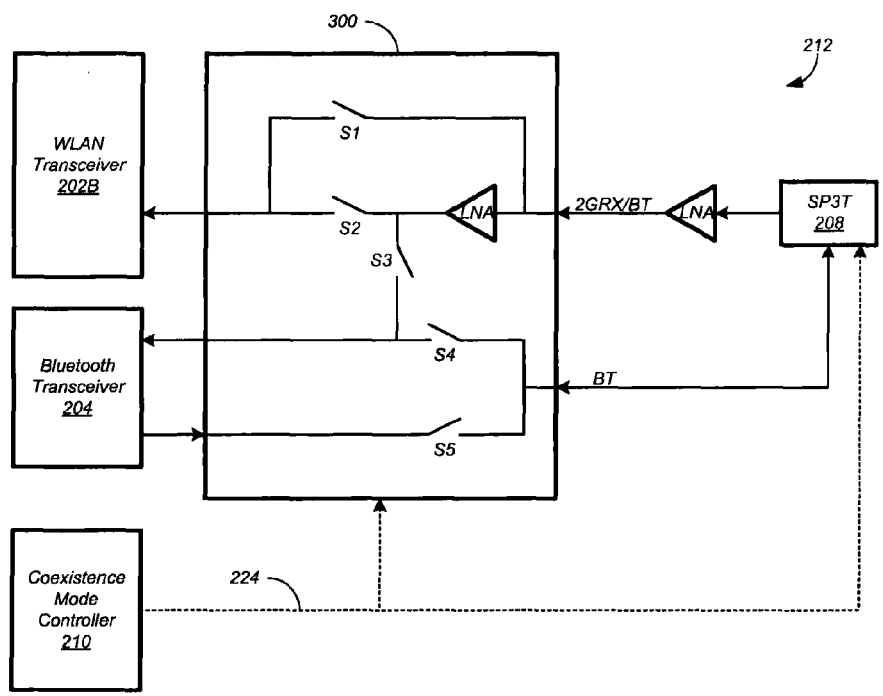
FIG. 3 shows detail of a shared path module that allows the SoC of FIG. 2 to receive WLAN signals and Bluetooth signals simultaneously according to one embodiment.

In some embodiments, SoC 212 includes a shared path module that allows SoC 212 to simultaneously receive WLAN signals and Bluetooth signals. FIG. 3 shows detail of the shared path module according to one embodiment. Referring to FIG. 3, SoC 212 includes WLAN transceiver 202B, Bluetooth transceiver 204, coexistence mode controller 210, SP3T switch 208, an LNA, and shared path module 300. Shared path module 300 includes five switches S1, S2, S3, S4 and S5 and an LNA. Switches S operate according to switch control signal 224. The operation of switches S is described below.

Figure 4:
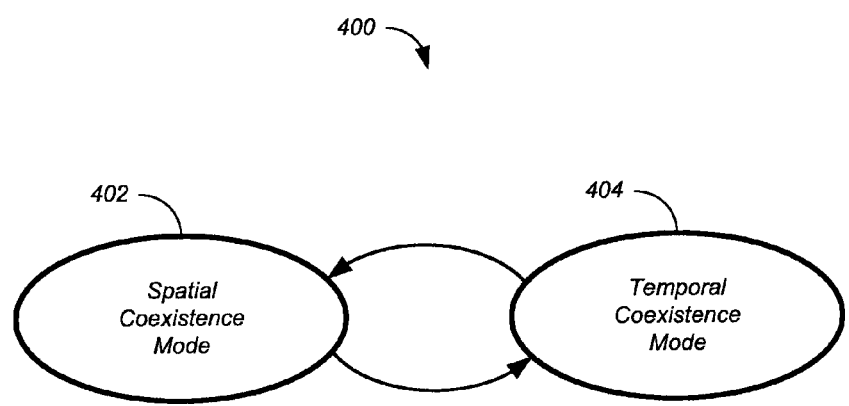
FIG. 4 shows a coexistence state diagram for the dual-technology wireless communication device of FIGS. 2 and 3 according to one embodiment.

FIG. 4 shows a coexistence state diagram 400 for dual-technology wireless communication device 200 of FIGS. 2 and 3 according to one embodiment. State diagram 400 includes a state 402 for the spatial coexistence mode, and a state 404 for the temporal coexistence mode. Note some embodiments do not implement the temporal coexistence mode.

Coexistence mode controller 210 selects either a spatial coexistence mode (state 402) or a temporal coexistence mode (state 404). The spatial coexistence mode is a mode in which the WLAN signals and Bluetooth signals simultaneously employ different antennas, and the temporal coexistence mode is a mode in which the WLAN signals and Bluetooth signals employ the same antennas, but at different times. Spatial coexistence mode controller 220 controls transceivers 202, 204 when the spatial coexistence mode is selected. Temporal coexistence mode controller 222 controls transceivers 202, 204 when the temporal coexistence mode is selected. Coexistence mode controller 210 selects either the spatial coexistence mode or the temporal coexistence mode based on factors including Bluetooth (that is, non-WLAN) traffic levels, Bluetooth (that is, non-WLAN) signal levels, Bluetooth (that is, non-WLAN) operating bandwidth, Bluetooth (that is, non-WLAN) operating frequencies, WLAN signal levels, WLAN traffic levels, WLAN operating bandwidth, WLAN operating frequencies, and the like. For example, when the WLAN operating frequency is 5 GHz, then coexistense is disabled.

For example, coexistence mode controller 210 can select the spatial coexistence mode when the Bluetooth traffic level is high, and can select the temporal coexistence mode when the Bluetooth traffic level is low. Coexistence mode controller 210 can determine the Bluetooth traffic level based on the Bluetooth profile, by tracking Bluetooth activity, and the like. For example, Bluetooth activity can be tracked by measuring the number of Bluetooth packets transmitted and/or received during a chosen interval.

Figure 5:
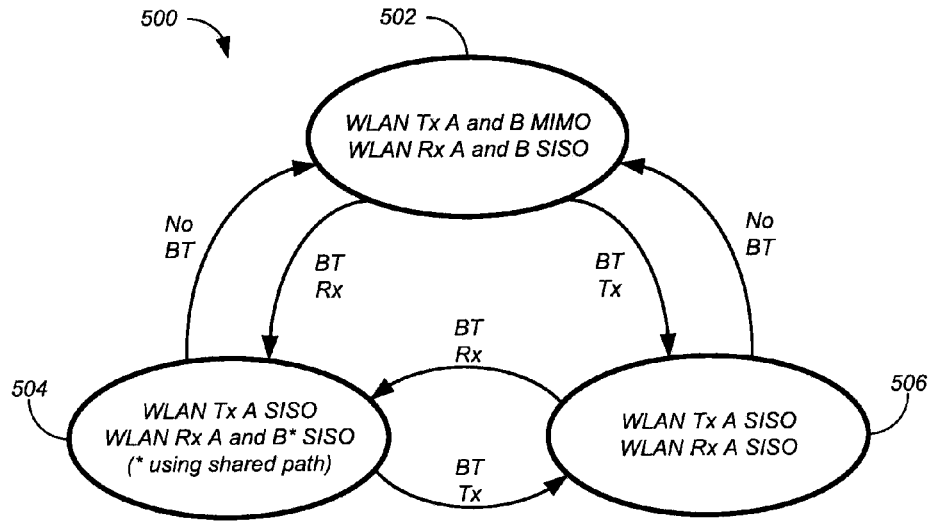
FIG. 5 shows a spatial coexistence state diagram for the spatial coexistence mode controller of FIG. 2 according to one embodiment.
Figure 6:
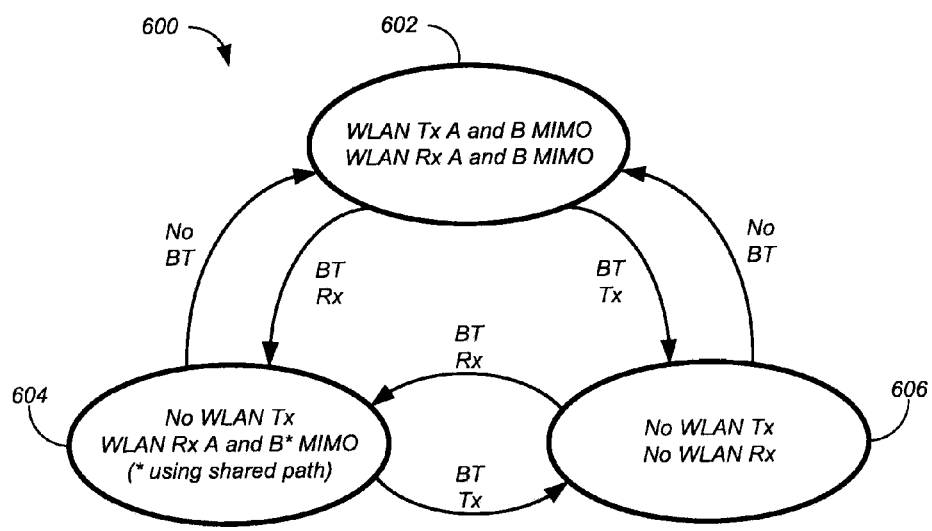
FIG. 6 shows a temporal coexistence state diagram for the temporal coexistence mode controller of FIG. 2 according to one embodiment.

FIGS. 5 and 6 show coexistence state diagrams for the spatial coexistence mode and the temporal coexistence mode, respectively. In these state diagrams, WLAN transceivers 202A and 202B are denoted A and B, respectively. In addition, transmit and receive operations are denoted Tx and Rx, respectively. For example, referring to state 502 in FIG. 5, the phrase "WLAN Tx A and B MIMO" indicates that WLAN transceivers 202A and 202B can transmit together in MIMO mode. The state diagrams of FIGS. 5 and 6 are now described in detail.

FIG. 5 shows a spatial coexistence state diagram 500 for spatial coexistence mode controller 220 of FIG. 2 according to one embodiment. State diagram 500 includes three states 502, 504, and 506. Spatial coexistence mode controller 220 controls transceivers 202, 204 with mode control signals 226 according to the selected state.

Spatial coexistence mode controller 220 selects state 502 when no Bluetooth traffic is present (No BT). In state 502, spatial coexistence mode controller 220 allows WLAN transceivers 202 to transmit in multiple-input and multiple-output (MIMO) mode, and to receive in single-input and single-output (SISO) mode. In state 502, WLAN transceivers 202 can transmit in MIMO mode because the Bluetooth transmit schedule is known to spatial coexistence mode controller 220. However, WLAN transceivers 202 cannot receive in MIMO mode because the Bluetooth receive schedule is not known to spatial coexistence mode controller 220. In state 502, spatial coexistence mode controller 220 employs shared path module 300 to allow WLAN transceiver 202B to receive. Referring to FIG. 3, in state 502, spatial coexistence mode controller 220 employs switch control signals 224 to open switches S2, S3, S4, and S5, and to close switch S1.

Referring again to FIG. 5, spatial coexistence mode controller 220 selects state 504 when Bluetooth receive traffic (BT Rx) is present. In state 504, spatial coexistence mode controller 220 allows WLAN transceiver 202A to transmit and receive in SISO mode, and allows WLAN transceiver 202B to receive in SISO mode but not to transmit. In state 504, spatial coexistence mode controller 220 employs shared path module 300 to allow simultaneous receive for WLAN transceiver 202B and Bluetooth transceiver 204. Referring to FIG. 3, in state 504, spatial coexistence mode controller 220 employs switch control signals 224 to open switches S1, S4, and S5, and to close switches S2 and S3, in shared path module 300.

Referring again to FIG. 5, spatial coexistence mode controller 220 selects state 506 when Bluetooth transceiver 204 is transmitting (BT Tx). In state 506, spatial coexistence mode controller 220 allows WLAN transceiver 202A to transmit and receive in SISO mode, and allows WLAN transceiver 202B to neither transmit nor receive. In state 506, spatial coexistence mode controller 220 employs shared path module 300 to allow Bluetooth transceiver 202 to transmit. Referring to FIG. 3, in state 506, spatial coexistence mode controller 220 employs switch control signals 224 to open switches S1, S2, S3, and S4, and to close switch S5.

FIG. 6 shows a temporal coexistence state diagram 600 for temporal coexistence mode controller 222 of FIG. 2 according to one embodiment. State diagram 600 includes three states 602, 604, and 606. Temporal coexistence mode controller 222 controls transceivers 202, 204 with mode control signals 226 according to the selected state.

Temporal coexistence mode controller 222 selects state 602 when no Bluetooth traffic is present (No BT). In state 602, temporal coexistence mode controller 222 allows both WLAN transceivers 202A, 202B to transmit and receive in MIMO mode. In state 602, temporal coexistence mode controller 222 employs shared path module 300 to allow WLAN transceiver 202B to receive. Referring to FIG. 3, in state 602, temporal coexistence mode controller 222 employs switch control signals 224 to open switches S2, S3, S4, and S5, and to close switch S1.

Referring again to FIG. 6, temporal coexistence mode controller 222 selects state 604 when Bluetooth receive traffic (BT Rx) is present. In state 604, temporal coexistence mode controller 222 allows WLAN transceivers 202A and 202B to receive in MIMO mode, but not to transmit. In state 604, temporal coexistence mode controller 222 employs shared path module 300 to allow simultaneous receive for WLAN transceiver 202B and Bluetooth transceiver 204. Referring to FIG. 3, in state 604, temporal coexistence mode controller 222 employs switch control signals 224 to open switches S1, S4, and S5, and to close switches S2 and S3, in shared path module 300.

Referring again to FIG. 6, temporal coexistence mode controller 222 selects state 606 when Bluetooth transceiver 204 is transmitting (BT Tx). In state 606, temporal coexistence mode controller 222 allows neither WLAN transceiver 202A nor WLAN transceiver 202B to transmit or receive. In state 606, temporal coexistence mode controller 222 employs shared path module 300 to allow Bluetooth transmit. Referring to FIG. 3, in state 606, temporal coexistence mode controller 222 employs switch control signals 224 to open switches S1, S2, S3, and S4, and to close switch S5.

To transition between MIMO and SISO modes, coexistence mode controller 210 negotiates the number of WLAN spatial streams with the link partner, access point, or the like. For example, coexistence mode controller 210 can indicate a reduced number of spatial streams supported by causing WLAN transmission of a MIMO power save (PS) action frame. On receipt of the frame, an access point shall not transmit rates having more than one stream. This access point function is mandatory for all IEEE 802.11n access points. However, device 200 remains free to transmit any rate 1 or rate 2 stream. The negotiation can be performed dynamically (that is, within an association) or during the association phase. The WLAN link to the peer is not broken, even when the coexistence mode is changed.

Figure 7:
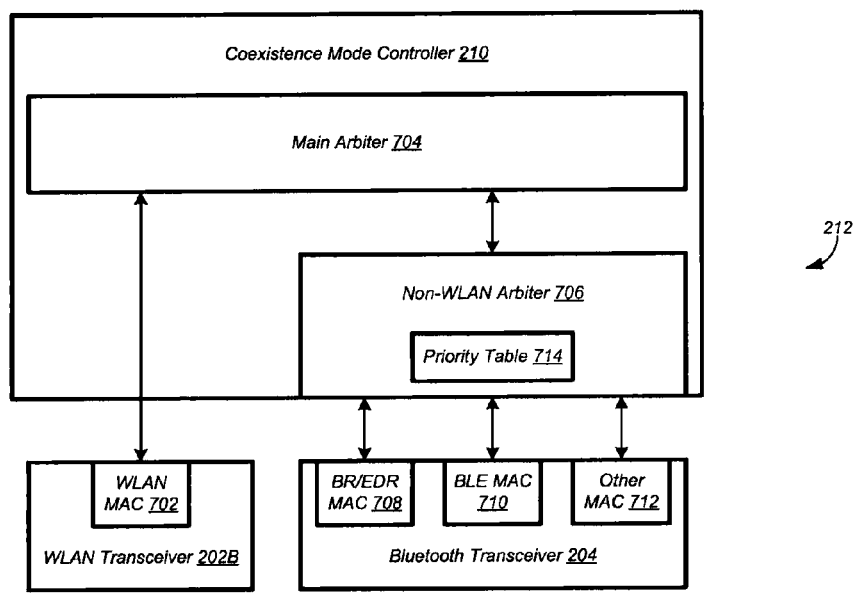
FIG. 7 shows detail of the SoC of FIG. 2, including arbiters to manage the sharing of the shared antenna, according to one embodiment.

Some embodiments include one or more arbiters to manage sharing of shared antenna 206B. FIG. 7 shows detail of SoC 212 of FIG. 2 according to one such embodiment. Referring to FIG. 7, WLAN Transceiver 202B includes a WLAN media access controller (MAC) 702. Bluetooth transceiver 204 includes three non-WLAN MACs: a Bluetooth basic rate/enhanced data rate (BR/EDR) MAC 708, a Bluetooth low energy (BLE) MAC 710, and a MAC 712 for other non-WLAN wireless technologies. Coexistence mode controller 210 includes a main arbiter 704 and a non-WLAN arbiter 706. Non-WLAN arbiter 706 includes a priority table 714.

Non-WLAN MACs 708, 710, and 712 send communication requests to non-WLAN arbiter 706. Non-WLAN arbiter 706 selects one of the non-WLAN MACs 708, 710, and 712 based on the contents of priority table 714. Priority table 714 includes programmable priorities based on packet types and the like. Other arbitration schemes can be used as well or instead.

WLAN MAC 702 sends communication requests to main arbiter 704. In temporal coexistence mode, main arbiter 704 grants shared antenna 206B to either the winner of the non-WLAN arbitration or WLAN MAC 702. In spatial coexistence mode, main arbiter 704 grants shared antenna 206B to the winner of the non-WLAN arbitration.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. For example, one or more states in the state diagrams described above may be performed in a different order and still achieve desirable results. Accordingly, other implementations are within the scope of the following claims.

What is claimed is:
1. A wireless device, comprising:
a first antenna;
a second antenna;
a first wireless local-area network (WLAN) transceiver, wherein the first WLAN transceiver is configured to operate, on a dedicated basis, using the first antenna;
a second WLAN transceiver;
a non-WLAN transceiver, wherein the non-WLAN transceiver and the second WLAN transceiver are configured to share operation of the second antenna,
wherein each of the first antenna, the second antenna, the first WLAN transceiver, the second MAN transceiver, and the non-WLAN transceiver is located in the wireless device; and
a coexistence mode controller configured to select between a spatial coexistence mode and a temporal coexistence mode,
wherein in the spatial coexistence mode, each of the first WLAN transceiver, the second WLAN transceiver, and the non-WLAN transceiver are configured to use respective ones of the first antenna and the second antenna at a same time,
wherein in the temporal coexistence mode, each of the first WLAN transceiver, the second WLAN transceiver, and the non-WLAN transceiver are configured to use each of the first antenna and the second antenna at different times, and
wherein in each of the spatial coexistence mode and the temporal coexistence mode, the coexistence mode controller is configured to selectively allow the second WLAN transceiver to share operation of the second antenna.

2. The wireless device of claim 1, further comprising:
a spatial coexistence mode controller,
wherein the spatial coexistence mode controller is configured to, when no non-WLAN traffic is present, allow each of the first WLAN transceiver and the second WLAN transceiver to i) transmit in MIMO mode, and ii) receive in SISO mode,
wherein the spatial coexistence mode controller is further configured to, when the non-WLAN transceiver is transmitting, i) allow the first WLAN transceiver to transmit and receive in SISO mode, and ii) allow the second WLAN transceiver to neither transmit nor receive; and
wherein the spatial coexistence mode controller is further configured to, when the non-WLAN transceiver is receiving, i) allow the first WLAN transceiver to transmit and receive in SISO mode, and ii) allow the second WLAN transceiver to receive in SISO mode but not to transmit.

3. The wireless device of claim 2, further comprising:
a temporal coexistence mode controller,
wherein the spatial coexistence mode controller is further configured to, when the spatial coexistence mode is selected, control each of the first WLAN transceiver, the second WLAN transceiver, and the non-WLAN transceiver, and
wherein the temporal coexistence mode controller is configured to, when the temporal coexistence mode is selected, control each of the first WLAN transceiver, the second WLAN transceiver, and the non-WLAN transceiver.

4. The wireless device of claim 3, wherein:
the temporal coexistence mode controller is further configured to, when no non-WLAN traffic is present, allow each of the first WLAN transceiver and the second WLAN transceiver to transmit and receive in MIMO mode;
the temporal coexistence mode controller is further configured to, when the non-WLAN transceiver is transmitting, allow neither the first WLAN transceiver nor the second WLAN transceiver to transmit or receive; and
the temporal coexistence mode controller is further configured to, when the non-WLAN transceiver is receiving, allow each of the first WLAN transceiver and the second WLAN transceiver to receive in MIMO mode, but not to transmit.

5. The wireless device of claim 3, wherein:
the coexistence mode controller is further configured to select either the spatial coexistence mode or the temporal coexistence mode based on at least one of non-WLAN traffic levels,
non-WLAN signal levels,
non-WLAN operating bandwidth,
non-WLAN operating frequencies,
WLAN signal levels,
WLAN traffic levels,
WLAN operating bandwidth, and
WLAN operating frequencies.

6. The wireless device of claim 3, wherein:
the coexistence mode controller is further configured to negotiate a number of WLAN streams with an access point.

7. The wireless device of claim 3, wherein:
the coexistence mode controller is further configured to control sharing of the second antenna between the second WLAN transceiver and the non-WLAN transceiver.

8. The wireless device of claim 1, wherein the wireless device is implemented as one of:
a mobile telephone;
a personal digital assistant (PDA); and
a personal computer.

9. The wireless device of claim 8, wherein the wireless device is compliant with all or part of IEEE standard 802.11, including draft and approved amendments 802.11a, 802.11b, 802.11d, 802.11e, 802.11g, 802.11h, 802.11i, 802.11k, 802.11n, 802.11p, 802.11r, 802.11s, 802.11u, 802.11v, 802.11w, 802.11z, and 802.11aa.

10. A method of transmitting and receiving communications in a device, wherein the device includes a first antenna, a second antenna, a first wireless local-area network (WLAN) transceiver, a second WLAN transceiver, and a non-WLAN transceiver, and wherein the method comprises:
operating the first WLAN transceiver with the first antenna on a dedicated basis;
operating the second WLAN transceiver and the non-WLAN transceiver with the second antenna on a shared basis;
selecting between a spatial coexistence mode and a temporal coexistence mode,
wherein in the spatial coexistence mode, each of the first WLAN transceiver, the second WLAN transceiver, and the non-WLAN transceiver are configured to use respective ones of the first antenna and the second antenna at a same time,
wherein in the temporal coexistence mode, each of the first WLAN transceiver, the second WLAN transceiver, and the non-WLAN transceiver are configured to use each of the first antenna and the second antenna at different times; and
in each of the spatial coexistence mode and the temporal coexistence mode, selectively allowing the second WLAN transceiver to share operation of the second antenna.

11. The method of claim 10, wherein operating each of the first WLAN transceiver, the second WLAN transceiver, and the non-WLAN transceiver comprises:
when no non-WLAN traffic is present, allowing the first and second WLAN transceivers to i) transmit in MIMO mode, and ii) receive in SISO mode,
when the non-WLAN transceiver is transmitting, i) allowing the first WLAN transceiver to transmit and receive in SISO mode, and ii) allowing the second WLAN transceiver to neither transmit nor receive, and
when the non-WLAN transceiver is receiving, i) allowing the first WLAN transceiver to transmit and receive in SISO mode, and ii) allowing the second WLAN transceiver to receive in SISO mode but not to transmit.

12. The method of claim 11,
wherein operating each of the first WLAN transceiver, the second WLAN transceiver, and the non-WLAN transceiver comprises
allowing the first and second WLAN transceivers to transmit and receive in MIMO mode when i) no non-WLAN traffic is present and ii) the temporal coexistence mode is selected,
allowing neither the first WLAN transceiver nor the second WLAN transceiver to transmit or receive when i) the non-WLAN transceiver is transmitting and ii) the temporal coexistence mode is selected, and
allowing the first and second WLAN transceivers to receive in MIMO mode, but not to transmit, when i) the non-WLAN transceiver is receiving and ii) the temporal coexistence mode is selected.

13. The method of claim 12, further comprising:
selecting either the spatial coexistence mode or the temporal coexistence mode based on at least one of
non-WLAN traffic levels,
non-WLAN signal levels,
non-WLAN operating bandwidth,
non-WLAN operating frequencies,
WLAN signal levels,
WLAN traffic levels,
WLAN operating bandwidth, and
WLAN operating frequencies.

14. The method of claim 12, further comprising:
negotiating a number of WLAN streams with an access point.

15. The method of claim 10, further comprising:
controlling sharing of the second antenna between the second WLAN transceiver and the non-WLAN transceiver.

16. The method of claim 10, wherein the method is compliant with all or part of IEEE standard 802.11, including draft and approved amendments 802.11a, 802.11b, 802.11d, 802.11e, 802.11g, 802.11h, 802.11i, 802.11k, 802.11n, 802.11p, 802.11r, 802.11s, 802.11u, 802.11v, 802.11w, 802.11z, and 802.11aa.

17. Non-transitory computer-readable media embodying instructions executable by a computer to perform functions, comprising:
operating a first wireless local-area network (WLAN) transceiver with a first antenna on a dedicated basis;
operating a second WLAN transceiver with a second antenna;
operating a non-WLAN transceiver with the second antenna,
wherein each of the first antenna, the second antenna, the first WLAN transceiver, the second WLAN transceiver, and the non-WLAN transceiver is located in a same wireless device;
selecting between a spatial coexistence mode and a temporal coexistence mode,
wherein in the spatial coexistence mode, each of the first WLAN transceiver, the second WLAN transceiver, and the non-WLAN transceiver are configured to use respective ones of the first antenna and the second antenna at a same time,
wherein in the temporal coexistence mode, each of the first WLAN transceiver, the second WLAN transceiver, and the non-WLAN transceiver are configured to use each of the first antenna and the second antenna at different times; and in each of the spatial coexistence mode and the temporal coexistence mode, selectively allowing the second WLAN transceiver to share operation of the second antenna.

18. The non-transitory computer-readable media of claim 17, wherein the functions further comprise:
    when no non-WLAN traffic is present, allowing each of the first WLAN transceiver and the second WLAN transceiver to i) transmit in MIMO mode, and ii) receive in SISO mode;
    when the non-WLAN transceiver is transmitting, i) allowing the first WLAN transceiver to transmit and receive in SISO mode, and ii) allowing the second WLAN transceiver to neither transmit nor receive; and
    when the non-WLAN transceiver is receiving, i) allowing the first WLAN transceiver to transmit and receive in SISO mode, and ii) allowing the second WLAN transceiver to receive in SISO mode but not to transmit.

19. The non-transitory computer-readable media of claim 18, wherein the functions further comprise:
    allowing each of the first WLAN transceiver and the second WLAN transceiver to transmit and receive in MIMO mode when i) no non-WLAN traffic is present and ii) the temporal coexistence mode is selected;
    allowing neither the first WLAN transceiver nor the second WLAN transceiver to transmit or receive when i) the non-WLAN transceiver is transmitting and ii) the temporal coexistence mode is selected; and
    allowing each of the first WLAN transceiver and the second WLAN transceiver to receive in MIMO mode, but not to transmit, when i) the non-WLAN transceiver is receiving and ii) the temporal coexistence mode is selected.

* * * * *